United States Patent
Xu et al.

(10) Patent No.: US 12,524,360 B1
(45) Date of Patent: Jan. 13, 2026

(54) OVERHEAD REDUCTION USING ADDRESS TRANSLATION IN DIRECT MEMORY ACCESSES

(71) Applicant: Amazon Technologies, Inc., Seattle, WA (US)

(72) Inventors: Kun Xu, Austin, TX (US); Ilya Minkin, Los Altos, CA (US); Ron Diamant, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 345 days.

(21) Appl. No.: 17/804,827

(22) Filed: May 31, 2022

(51) Int. Cl.
*G06F 13/28* (2006.01)
*G06F 12/1009* (2016.01)

(52) U.S. Cl.
CPC .......... *G06F 13/28* (2013.01); *G06F 12/1009* (2013.01); *G06F 2212/72* (2013.01); *G06F 2213/28* (2013.01)

(58) Field of Classification Search
CPC .. G06F 13/28; G06F 12/1009; G06F 2212/72; G06F 2213/28
USPC ............................................ 710/22
See application file for complete search history.

(56) References Cited

U.S. PATENT DOCUMENTS

| | | | | |
|---|---|---|---|---|
| 11,550,736 B1 * | 1/2023 | Xu | ....................... | G06F 13/1668 |
| 11,868,872 B1 * | 1/2024 | Minkin | .................... | G11C 11/54 |
| 2003/0140196 A1 * | 7/2003 | Wolrich | ................... | H04L 49/90 |
| | | | | 711/118 |
| 2004/0015622 A1 * | 1/2004 | Avery | ...................... | G06F 13/28 |
| | | | | 710/22 |
| 2005/0091239 A1 * | 4/2005 | Ward | ....................... | G06F 9/526 |
| 2013/0124929 A1 * | 5/2013 | Harada | .................. | G06F 11/006 |
| | | | | 714/49 |
| 2014/0189169 A1 * | 7/2014 | Litch | ....................... | G06F 13/28 |
| | | | | 710/22 |
| 2015/0120855 A1 * | 4/2015 | Izenberg | ........... | G06F 15/17331 |
| | | | | 709/212 |
| 2018/0129620 A1 * | 5/2018 | Gittins | ................. | G06F 12/1027 |
| 2019/0188554 A1 * | 6/2019 | Ma | ........................ | G06N 3/082 |
| 2019/0238460 A1 * | 8/2019 | Vasudevan | ............ | H04L 45/306 |
| 2019/0297015 A1 * | 9/2019 | Marolia | .................. | H04L 45/60 |
| 2022/0058469 A1 * | 2/2022 | Schwartz | ............... | G06N 3/084 |

* cited by examiner

*Primary Examiner* — Titus Wong
(74) *Attorney, Agent, or Firm* — Weaver Austin Villeneuve & Sampson LLP

(57) ABSTRACT

Techniques to reduce direct memory access (DMA) overhead may include retrieving an address translation descriptor from a descriptor queue of a DMA engine, and updating an address translation table in the DMA engine with address translation information obtained from the location indicated by the address translation descriptor. A set of memory descriptors is then obtained from the descriptor queue. The set of memory descriptors can be processed by determining that the addresses in the set of memory descriptors are to be translated using the address translation table, and performing memory access operations by using the address translation table to translate the addresses in the set of memory descriptors.

20 Claims, 9 Drawing Sheets

OVERHEAD REDUCTION USING ADDRESS TRANSLATION IN DIRECT MEMORY ACCESSES

BACKGROUND

A direct memory access (DMA) engine is an integrated circuit device that includes circuitry to perform DMA transfers. Direct memory access (DMA) is a data movement technique that allows data to be exchanged with a host while bypassing the host processor. By incorporating a DMA engine into a host system, memory transfers can be offloaded from the host processor onto the DMA engine. This can reduce the latency of the memory transfers because the memory transfers can be executed without waiting for the host processor to free up.

BRIEF DESCRIPTION OF THE DRAWINGS

Various embodiments in accordance with the present disclosure will be described with reference to the drawings, in which.

DETAILED DESCRIPTION

Figure 1:
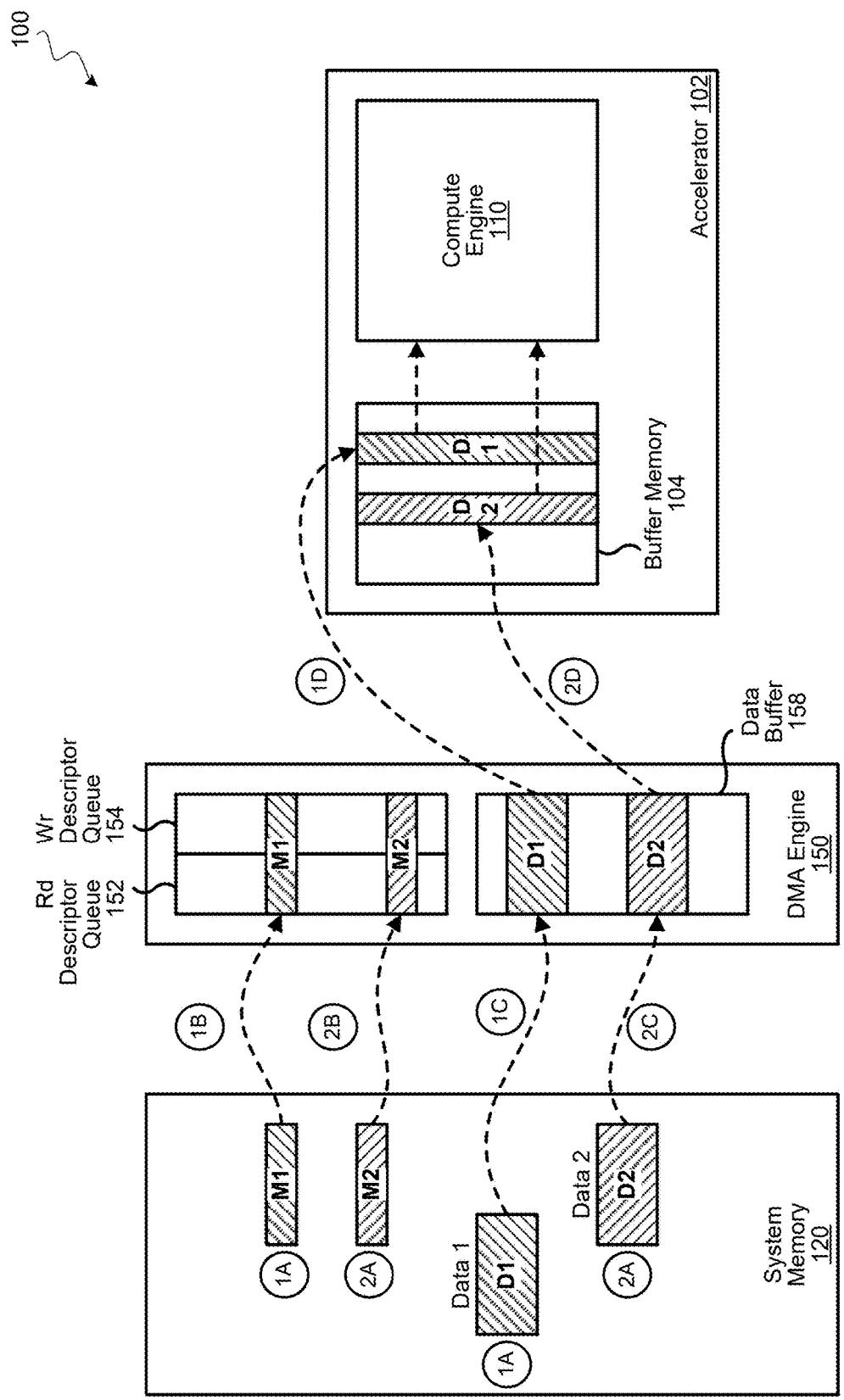
FIG. 1 illustrates a simplified block diagram of an example of a computing system.

To facilitate DMA transfers, a DMA engine is provided with memory descriptors to indicate the memory locations that should be read and/or written. In some instances, the memory locations are not known ahead of time and are determined on the fly during runtime execution of an application. For example, in an inference application (e.g., object recognition), the input data being analyzed can be received by the host system at various and/or random times. The exact location of where the input data is stored in system memory may vary, depending on which memory region is free at the time the input data is received and how the operating system or other memory management agent is utilizing the system memory. As such, the memory descriptors being used to move such data are not created until the input data is available. Subsequently, the memory descriptors also have to be copied to the DMA engine. Depending on the size and data layout of the data chunk being transferred, the number of memory descriptors can be in the range of hundreds of descriptors per data transfer. This can add up to millions of memory descriptors being generated on the fly during execution of the application. At that scale, the latency of generating the memory descriptors by the host system becomes significant and may adversely impact the execution of the application.

In most scenarios, the data associated with memory descriptors that are generated on the fly have similar access patterns. For example, if the data being transferred are instances of input data being loaded into a compute engine, the data transfer for each instance of input data will likely have a similar size and data layout to fit the compute engine's computational datapath. As such, the memory descriptors generated for each instance will be similar, except for the addresses, which are determined at runtime. To take advantage of the similarity in the memory descriptors used for each instance of the data transfer, the techniques disclosed herein provide a mechanism to reuse memory descriptors for different data transfers despite the addresses being unknown until runtime. The set of memory descriptors for a data transfer can be generated once and be populated with logical addresses. At runtime, the logical addresses can be translated to the actual addresses that are used for the data transfer. Once generated, the memory descriptors can be retained in system memory, and be provided to the DMA engine multiple times for processing to effectuate different data transfers. Prior to each data transfer, the address translation information can be updated to reflect the actual addresses when they become known.

To facilitate the address translation, the DMA engine may include a local address translation table to store the address translation information. During operation, when a memory descriptor is processed, if the address in the memory descriptor is within an address translation window defined in the address translation table, the data transfer associated with the memory descriptor can be performed by translating the address of the memory descriptor into a translated address. If the address in the memory descriptor is outside the address translation window, the data transfer associated with the memory descriptor can be performed using the address given in the memory descriptor without translation.

To update the address translation information for different instances of data transfer, when the actual address associated with a data transfer is known, address translation data indicating the actual address can be generated and stored in system memory. An address translation descriptor pointing to the location of the address translation data can also be generated. The address translation descriptor can then be loaded into the descriptor queue of the DMA engine during operation. When the address translation descriptor is processed by the DMA engine, the DMA engine can retrieve the address translation data from system memory and update the local address transition table with the new address translation data. Subsequent memory descriptors having an address within the address translation window can then be processed using the updated address translation information.

Hence, by updating the address translation information, the memory descriptors generated for a data transfer can be reused multiple times to perform different instances of similar data transfer. Instead of having to generate hundreds of memory descriptors for each data transfer, the DMA overhead for each data transfer can be reduced to generating one address translation descriptor, and retrieving the address translation information to update the address translation information for the data transfer. By utilizing such techniques, the execution latency can be reduced because the data transfer can be performed without having to wait for the hundreds of memory descriptors to be generated on the fly. In some implementations, if the DMA engine has sufficient capacity to store and cache the memory descriptors, the transfer of the memory descriptors from system memory to the DMA engine may only need to occur once, and subsequent data transfers can process the cached memory descriptors. This can free up the throughput of the interface between the DMA engine and system memory such that the data transfer bandwidth that would have otherwise been taken up for copying the memory descriptors into the DMA engine can instead be used for actual data transfer.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates a simplified block diagram of an example of a computing system 100. Computing system 100 includes a DMA engine 150, system memory 120, and an accelerator 102. Computing system 100 may act as a host system for accelerator 102, and may include other components not specifically shown, such as a host processor.

Accelerator 102 is an integrated circuit device with circuitry designed to speed up certain operations. For example, accelerator 102 can be a neural network processor, a graphics processing unit, a digital signal processor, a cryptoprocessor, or other application specific integrated circuit. Accelerator 102 may include a compute engine 110 to process data and/or perform computations on data. Accelerator 102 may also include a buffer memory 104 to store data being loaded into compute engine 110. For instance, in implementations in which accelerator 102 is a neural network processor, compute engine 110 can be a processing engine array (e.g., a systolic array) and buffer memory 104 can be a state buffer. The processing engine array may include an array of processing engines arranged in rows and columns. Each processing engine is capable of performing a multiply-and-add operation (e.g., to perform matrix multiplication operations for a neural network model). The state buffer can be used to store input data such as feature map values and weight values for the processing engine array. During operation, the input data are shifted into the processing engine array from the state buffer along the rows of the array. The computation results of the processing engines are accumulated along the column direction, and can be fed back to the state buffer for further computations.

System memory 120 is used by the computing system 100 to store various data, which may include software such as an operating system, drivers, and software applications. System memory 120 can be implemented using random access memory and/or persistent storage. For example, system memory 120 may include one or more of dynamic random access memory (DRAM), static random access memory (SRAM), flash memory, 3D cross-point memory, magnetic storage, optical storage, solid state drive, etc. System memory 120 can be used to store data that are not currently being processed in accelerator 102. As computations are carried out, data needed by accelerator 102 can be transferred from system memory 120 into the buffer memory 104 of accelerator 102, and data no longer needed by accelerator 102 can be transferred from the accelerator back to system memory 120.

Data transfers between system memory 120 and other components of computing system 100 may involve a host processor (not shown) to issue read and write commands to system memory 120. Such memory accesses through a host processor may incur unnecessary latency, especially when the host processor is not a consumer or generator of the data being accessed. To bypass the host processor, DMA engine 150 can be used to directly exchange data between system memory 120 and accelerator 102.

DMA engine 150 may include a DMA queue to store memory descriptors. In some implementations, the DMA queue can be implemented using a queue pair that includes a read descriptor queue 152 and a write descriptor queue 154. DMA engine 150 may also include multiple DMA queues and/or multiple queue pairs. Each memory descriptor may contain information about a segment of data to move. For example, if the memory descriptor is used for reading data, the read memory descriptor can be placed in the read descriptor queue and may include the source address of the data, and a length of the data to read. The read memory descriptor can be paired with a write memory descriptor placed in the write descriptor queue. The write memory descriptor may include a target address identify the location to write the data, and a length of the data to write. To transfer a chunk of data, multiple memory descriptors may be used. For example, the chunk of data may not necessarily be stored across contiguous addresses at the source or at the target, and thus multiple memory descriptors can be used to identify addresses of data segments making up the chunk of data.

DMA engine 150 also includes a data buffer 158 to temporarily store data being transferred via the DMA engine 150. In some implementations, similar to descriptor queue 152, data buffer 158 can be implemented using a read buffer to stored data being read, and a write buffer to sore data being written. A streaming interface can couple the read buffer to the write buffer such that data being read by the DMA engine 150 are streamed from the read buffer to the write buffer for writing to the target location.

During runtime of an application, data that becomes available to computing system 100 may need to be transferred to accelerator 102 for processing. The data may initially be stored in system memory 120. The location of the data can be determined on the fly, for example, depending on which region of system memory 120 is unused at the time the computing system 100 obtains the data. Because the location of the data may not be known ahead of time, memory descriptors being used to transfer the data from system memory 120 into accelerator 102 are also generated on the fly by the runtime driver.

By way of example, at time 1A, data D1 may become available to computing system 100 and is stored in system memory 120. Once the location of data D1 in system memory 120 is known, memory descriptors M1 including read memory descriptors and write memory descriptors being used to move data D1 into buffer memory 104 can be generated. At time 1B, memory descriptors M1 are loaded into the read descriptor queue 152 and write descriptor queue 154 of DMA engine. At time 1C, read memory descriptors of the memory descriptors M1 are processed by DMA engine 150 to read data D1 from system memory 120 into data buffer 158.

At time 1D, write memory descriptors of the memory descriptors M1 are processed by DMA engine 150 to write data D1 from data buffer 158 into buffer memory 104. Data D1 can then be loaded into compute engine 110 for processing by accelerator 102.

Then at time 2A, data D2 may become available to computing system 100 and is stored in system memory 120. Once the location of data D2 in system memory 120 is known, memory descriptors M2 including read memory descriptors and write memory descriptors being used to move data D2 into buffer memory 104 can be generated. At time 2B, memory descriptors M2 are loaded into the read descriptor queue 152 and write descriptor queue 154 of DMA engine. At time 2C, read memory descriptors of the memory descriptors M2 are processed by DMA engine 150 to read data D2 from system memory 120 into data buffer 158. At time 2D, write memory descriptors of the memory descriptors M2 are processed by DMA engine 150 to write data D2 from data buffer 158 into buffer memory 104. Data D2 can then be loaded into compute engine 110 for processing by accelerator 102.

In some scenarios, the timing of the data transfer of data D1 and data D2 may occur such that memory descriptors M1 and M2 may reside concurrently in the DMA engine, and/or that data D1 and D2 may reside concurrently in data buffer 158 as shown. The timing of the processing performed by accelerator 102 on data D1 and data D2 may also occur such that data D1 and D2 may reside concurrently in buffer memory 104 as shown. In other scenarios, the data transfer and/or processing of data D2 may occur much longer after data D1 has been processed, such that by the time data D2 becomes available, processing of data D1 has already been completed. In such scenarios, memory descriptors M1 and data D1 may no longer be present in DMA engine 150 and/or accelerator 102 when data D2 becomes available. In such scenarios, it's also possible for data D2 to be placed into buffer memory 104 at the same location as data D1.

Irrespective of the relative timing of data D1 and D2, in order for DMA engine 150 to perform the data transfer for data D1, the runtime driver may have to generate memory descriptors M1 after data D1 becomes available, and then copy memory descriptors M1 from system memory 120 into descriptor queue 152. Similarly, in order for DMA engine 150 to perform the data transfer for data D2, the runtime driver may have to generate memory descriptors M2 after data D2 becomes available, and then copy memory descriptors M2 from system memory 120 into descriptor queue 152. This process and the associated latency incurred to generate the memory descriptors can be repeated for each instance of moving data from system memory 120 into accelerator 102 for processing.

Figure 2:
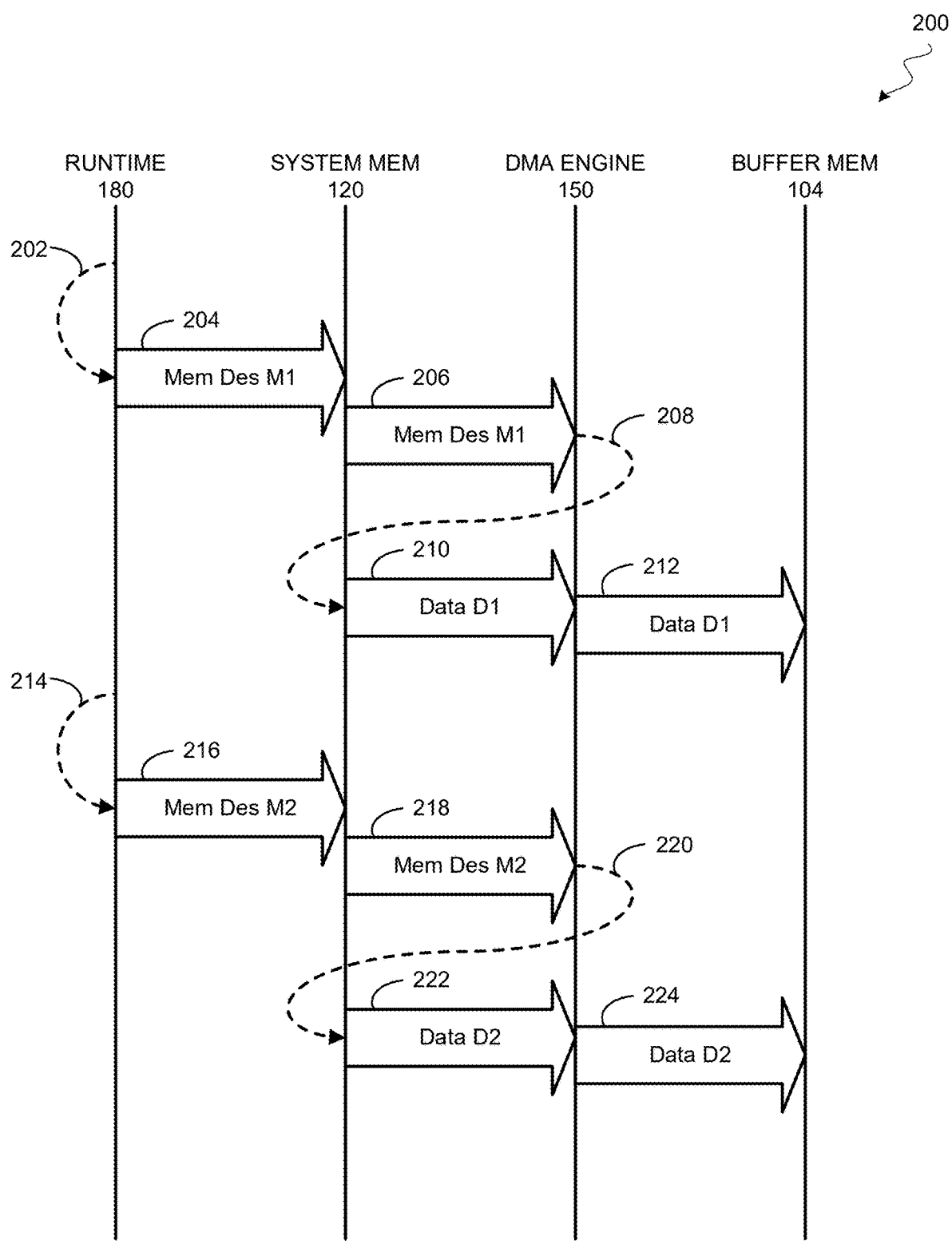
FIG. 2 illustrates a communication flow diagram of an example of interactions between components of a computing system.

FIG. 2 illustrates a communication flow diagram 200 of an example of the interactions between components of a computing system for moving data from system memory to a buffer memory. The computing system can be, for example, computing system 100, and may include system memory 120, DMA engine 150, and buffer memory 104 of an accelerator. The computing system may also include a runtime driver 180. Runtime driver 180 may also be referred to as a device driver, and is used to manage the accelerator and provide an interface between applications executing on the computing system and the accelerator. For example, runtime driver 180 can provide an Application Program Interface (API) that defines functions for feeding input data to the accelerator, and define the computations to perform on the input data. Runtime driver 180 can load or cause the accelerator to load input data to operate on, and/or can cause the accelerator to execute computations on the input data. Once the accelerator has finished operating on the input data, runtime driver 180 can be notified, and the result of the computations can be provided back to the application that requested the result.

Referring to FIG. 2, at operation 202, data D1 may become available to the computing system, and runtime driver 180 may generate a set of memory descriptors M1 to move data D1 from system memory 120 to buffer memory 104. At operation 204, the set of memory descriptors M1 generated at runtime are stored in system memory 120. At operation 206, the set of memory descriptors M1 are loaded into DMA engine 150. At operation 208, the DMA engine 150 processes the set of memory descriptors M1 to access data D1 from system memory 120. At operation 210, data D1 is read from system memory 120 and transferred to DMA engine 150. At operation 212, data D1 is written from DMA engine 150 into the buffer memory 104 of the accelerator.

Similarly, at operation 214, data D2 may become available to the computing system, and runtime driver 180 may generate a set of memory descriptors M2 to move data D2 from system memory 120 to buffer memory 104. At operation 216, the set of memory descriptors M2 generated at runtime are stored in system memory 120. At operation 218, the set of memory descriptors M1 are loaded into DMA engine 150. At operation 220, the DMA engine 150 processes the set of memory descriptors M2 to access data D2 from system memory 120. At operation 222, data D2 is read from system memory 120 and transferred to DMA engine 150. At operation 224, data D2 is written from DMA engine 150 into the buffer memory 104 of the accelerator.

As illustrated in FIG. 2, for each instance of data transfer, a set of memory descriptors are generated by runtime driver, and each set of memory descriptors are loaded in the DMA engine. The number of memory descriptors in one set of memory descriptors for a data transfer can be in the range of hundreds of descriptors. Over the course of execution, the number of memory descriptors being loaded into the DMA engine during runtime can add up to millions of memory descriptors, taking up a significant amount of host processing time and latency to generate the memory descriptors.

To reduce the DMA overhead, instead of generating a new set of memory descriptors for each instance of data transfer, a reusable set of memory descriptors can be populated with logical addresses that are translated by the DMA engine. To facilitate the address translation, the DMA engine may include a local address translation table that is updated on the fly when the memory locations of new data transfers become known. Update of the address translation table can be carried out by processing an address translation descriptor.

Figure 3:
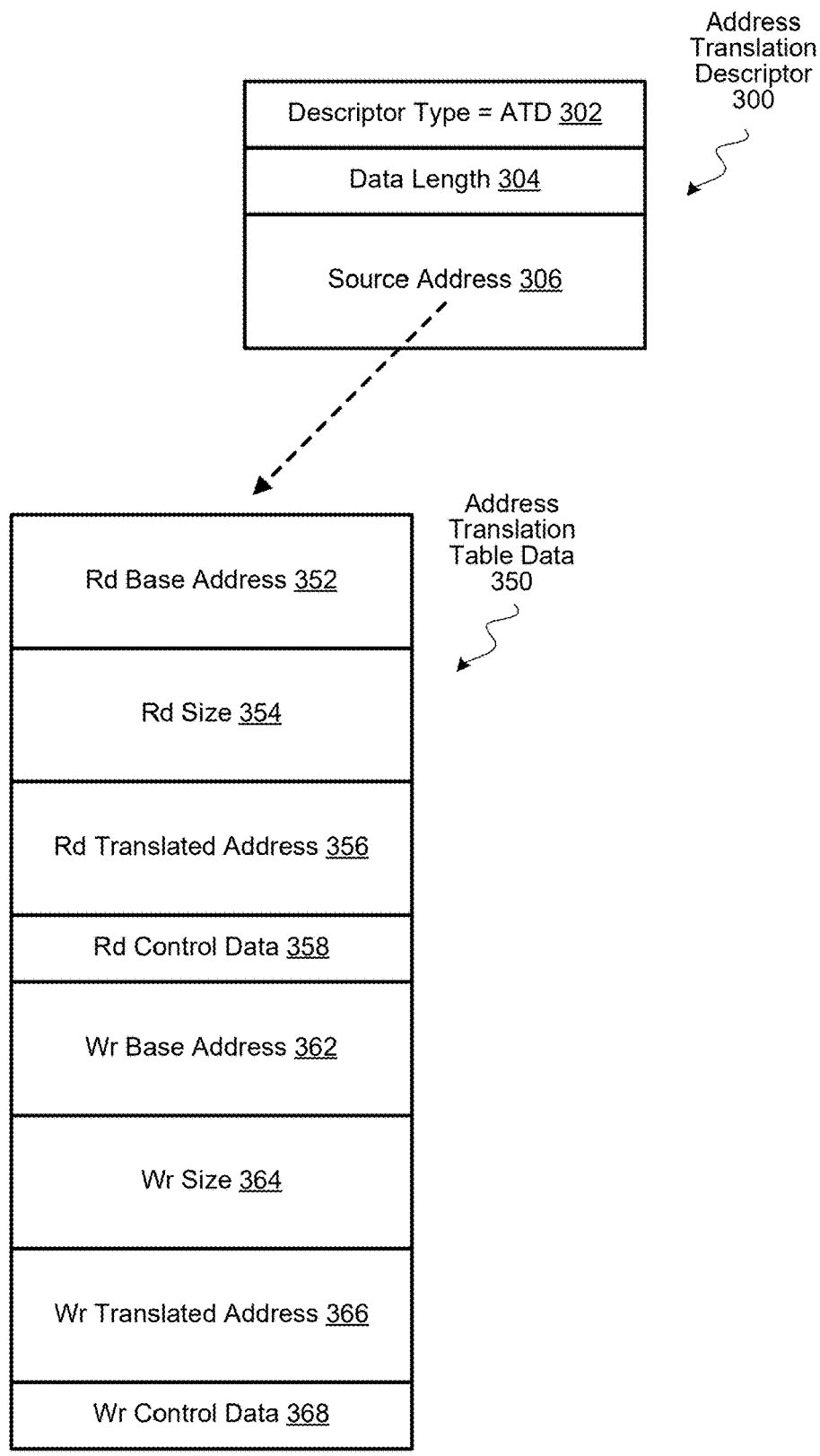
FIG. 3 illustrates an example of an address translation descriptor and an example of address translation table data.

FIG. 3 illustrates an example of an address translation descriptor 300 and an example of address translation table data 350. Address translation descriptor 300 may include a descriptor type field 302, a data length field 304, and a source address field 306. The descriptor type field 302 may include a value representing an address translation descriptor (ATD) that is used to identify to the DMA engine that this is a descriptor for updating the address translation table. The DMA engine may use this field to determine whether the descriptor is a normal memory descriptor for transferring data or an address translation descriptor to update the address translation table. The data length field 304 indicates the length of the data to read. The data length may correspond to the size of the address translation table. The source address field 306 indicates the memory location of the address translation table data containing the address translation information. For example, the source address field 306 may contain an address pointing to the location of the address translation table data stored in system memory.

Address translation table data 350 contains the information to be stored in the address translation table of the DMA engine. The address translation table data 350 may include address translation information for reads and/or writes. For example, the read address translation information may include information indicating an address translation window for reads (e.g., can be represented using a base address 352 indicating a starting address of the address translation window, and a size 354 of the address translation window), and translated address information 356. The address translation window provides a range of logical addresses that are subject to address translation when the address translation information is active. Addresses outside the address translation window are excluded from address translation. To prevent inadvertent translations, the address translation window can be defined in a logical address space that is outside the normal memory mapped address space of the computing device. For example, the most-significant bit(s) (MSB) of the address that are not used in the address space of the computing device can be repurposed to define the address translation window. Hence, if the normal address space used by the computing device ranges from address 0x0 to 0xFFFFFFFFFFFF, then the address translation window can start at address 0x1000000000000. Logical addresses at or above this starting address up to the window size can be translated by the DMA engine.

Translated address information 356 reflects the actual address that should be used for the data transfer. For example, the translated address information 356 may contain a set of address bits to replace a set of most-significant bits of the logical address received in the memory descriptors. As another example, the translated address information 356 may contain a value that is added to or subtracted from the logical address received in the memory descriptors to obtain the actual address of the data transfer.

Address translation table data 350 may also include control data 358. In some implementations, the control data 358 can be used to invalidate the address translation information stored in the address translation table of the DMA engine. When the control data 358 stored in the address translation table indicates that the address translation information is invalidated, data transfers can be performed without address translation regardless of whether the address in the memory descriptor falls within the invalidated address translation window. In other words, the control data 358 can be used to activate or deactivate the address translation function in the DMA engine.

The address translation table data 350 referenced by address translation descriptor 300 may also include write address translation information such as an address translation window used for writes (e.g., can be represented using a base address 362 indicating a starting address of the address translation window, and a size 364 of the address translation window), and translated address information 366. The write address translation information may also have its own control data 368.

In some implementations, the address translation table in the DMA engine may support multiple sets of address translation information concurrently such that addresses in different address ranges can be translated differently. In such implementations, the address translation table data 350 may include multiple sets of address translation information (e.g., address translation window and translated address information), and the control data may indicate which set of address translation information is active. For example, the control data may include one-hot encoding indicating which set of address translation information is valid and active. This may allow addresses falling in different address translation windows to be translated using different respective translated address information, as well as allow for each set of address translation information to be activated or deactivated independently.

Figure 4:
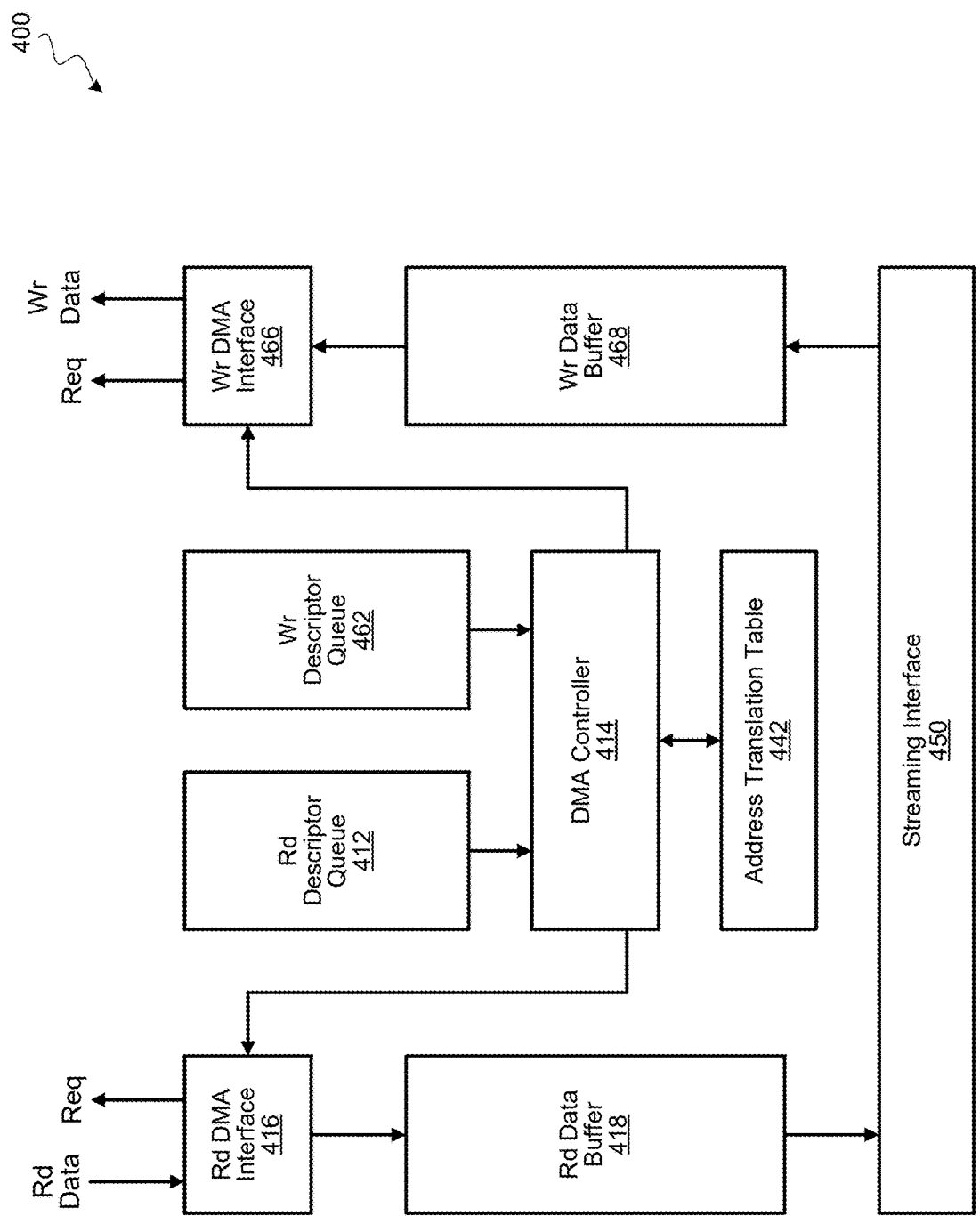
FIG. 4 illustrates a block diagram of an example of a direct memory access engine.

FIG. 4 illustrates a more detailed block diagram of an example of a DMA engine 400. DMA engine 400 can be one implementation of DMA engine 150 in computing system 100. DMA engine 400 may include a read datapath and a write datapath coupled to a streaming interface 450. The read datapath may include a read DMA interface 416 and a read data buffer 418. Operation of the read datapath is controlled by descriptors stored in a read descriptor queue 412. The write datapath may include a write DMA interface 466 and a write data buffer 468. Operation of the write datapath is controlled by descriptors stored in a write descriptor queue 462. Data read by the read datapath can be streamed to the write data path via streaming interface 450. Read descriptors can be paired with write descriptors to perform a data transfer that reads data from one location and writes the data being read to another location. The read data path and the write data path can also operate independently from each other. In some implementations, streaming interface 450 can be coupled to other components of a computing system to allow other components to obtain data from streaming interface 450 or to provide data to streaming interface 450.

Read descriptor queue 412 is a descriptor buffer/FIFO that stores read descriptors being processed by DMA engine 400. In some implementations, read descriptor queue 412 can be implemented as a ring queue. A head pointer can be used to indicate the location of the next descriptor to process, and a tail pointer can be used to indicate the location of the last descriptor available in the queue. As descriptors are process and descriptors are added to read descriptor queue 412, the head and tail pointers can be updated.

DMA engine 400 may include a DMA controller 414 to process descriptors retrieved from read descriptor queue 412. For example, DMA controller 414 may retrieve a descriptor from read descriptor queue 412, and parse the descriptor to determine the descriptor type to take the appropriate actions. For example, if the descriptor retrieved from read descriptor queue 412 is an address translation descriptor, DMA controller 414 may provide the address translation descriptor to read DMA interface 416 to obtain address translation table data from the address indicated in the descriptor, and update the contents of address translation table 442.

If the descriptor retrieved from read descriptor queue 412 is a memory descriptor, DMA controller 414 may determine whether address translation is to be performed on the address in the memory descriptor. For example, DMA controller 414 may check whether the address in the memory descriptor is within the address translation window stored in address translation table 442. If the address is within the address translation window, DMA controller 414 may modify the address according to the translated address information stored in the address translation table, and provide the modified memory descriptor to read DMA interface 416 to perform the requested data transfer using the translated address. If the address is outside the address translation window, DMA controller 414 may provide the unmodified memory descriptor to read DMA interface 416 to perform the requested data transfer using the original address in the memory descriptor. If the control data in the address translation table indicates that the address translation information is invalidated, DMA controller 414 may provide the unmodified memory descriptor to read DMA interface 416 regardless of whether the address is within the address translation window.

Read DMA interface 416 is operable to perform data transfers based on memory descriptors provided from DMA controller 414. For example, a memory descriptor provided by DMA controller 414 may include a data length, and an address indicating the location of the data to read. Read DMA interface 416 may send a request to the component of the computing system mapped to the address indicated in the memory descriptor to obtain the data length amount of data from that address. The data obtained from the address is then written into read data buffer 418. Streaming interface 450 may stream the data stored in read data buffer 418 to write data buffer 468 to transfer the data to the intended target location.

The write data buffer 468 and write DMA interface 466 operate in a similar manner as their read counterparts, with the exception that instead of obtaining data from components of a computing system, write DMA interface 466 is used for transferring data from write data buffer 468 to components of the computing system. For example, in response to a memory descriptor provided by DMA controller from the write descriptor queue 462, write DMA interface 466 may obtain data from write data buffer 468 provided by streaming interface 450, and transfer that data to a component of the computing system. The amount of data being obtained from write data buffer 468 and written to the target can be indicated by a data length provided in the memory descriptor, and write DMA interface 466 may write that data to the address provided in the memory descriptor. DMA controller 414 may perform address translation on the memory descriptors from the write descriptor queue 462 in a similar manner as described above for the read descriptor queue 412. In some implementations, address translation table 442 may contain separate sets of address translation information for reads and writes.

It should be noted that in some implementations, an address translation descriptor placed in the read descriptor queue 412 can be processed to update address translation table 442 with address translation information for both the read descriptor queue 412 and the write descriptor queue 462. In other words, it is not necessary to use separate address translation descriptors to update the address translation information for both reads and writes. It should also be noted that DMA engine 400 may include multiple read and write descriptor queue pairs, and each set of read and write descriptor queue pair may have its own corresponding address translation table. In some implementations, the address translation table can only be updated by an address translation descriptor placed in the corresponding queue or queue pair.

Figure 5:
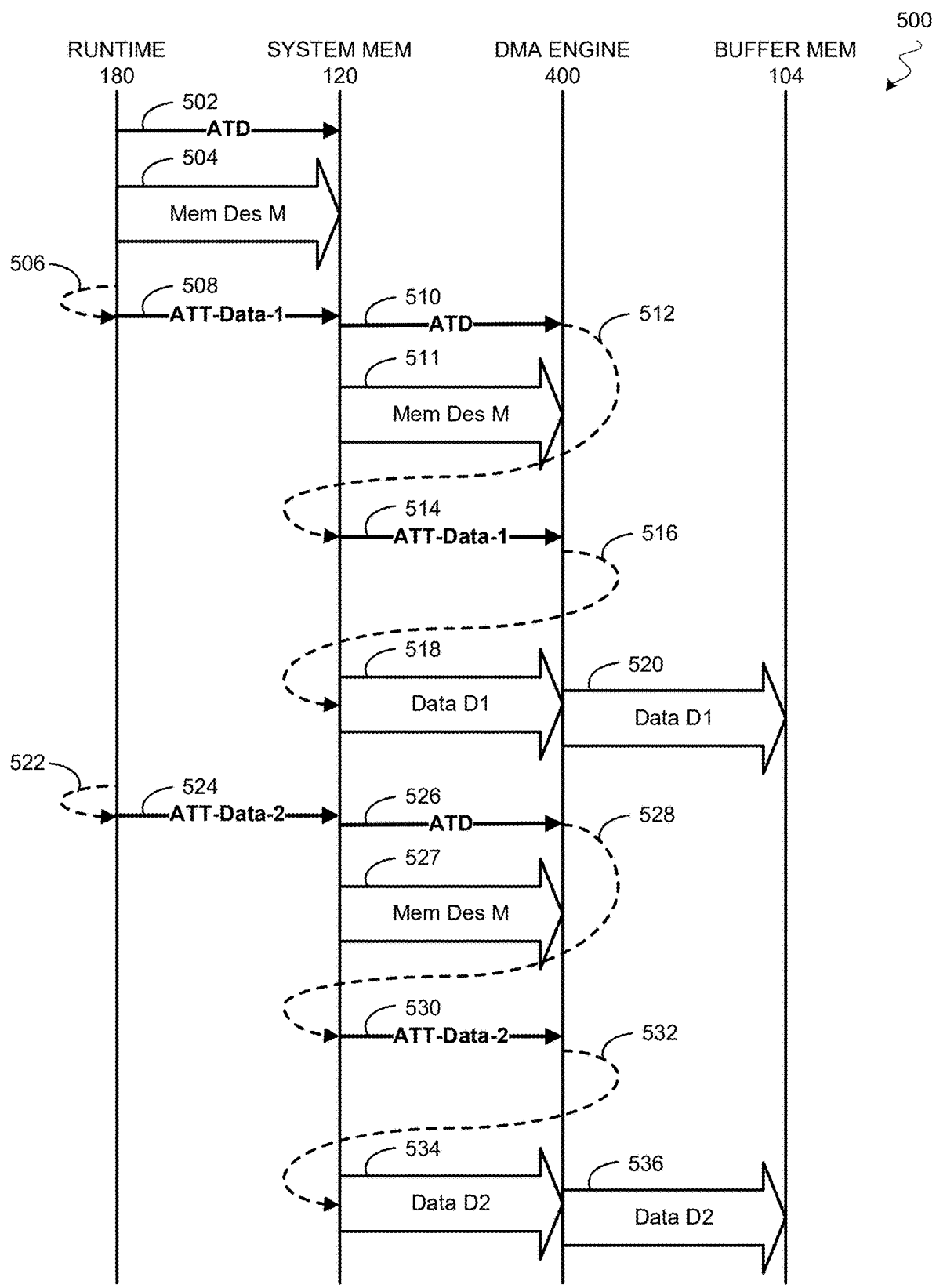
FIG. 5 illustrates a communication flow diagram of another example of interactions between components of a computing system.

FIG. 5 illustrates a communication flow diagram 500 of an example of the interactions between components of a computing system for moving data from system memory to a buffer memory. The computing system may be similar to computing system 100, and may include a runtime driver 180, system memory 120, and a buffer memory 104 of an accelerator. Computing system may also include DMA engine 400 having an address translation table to perform address translation such that a set of memory descriptors can be reused to perform memory accesses at different memory regions.

Referring to FIG. 5, at operation 502, an address translation descriptor ATD is generated and stored in system memory 120. The ATD contains an indication of the location to retrieve the address translation table data. For example, the ATD can be generated with an address pointing to a system memory location where the address translation table data will be stored. At operation 504, a set of memory descriptors M is generated by the runtime driver 582 and stored in system memory 120. The set of memory descriptors M may define an access pattern (e.g., define by the address offsets of the sequential memory descriptors) to perform a data transfer to move a chunk of data from system memory 120 to buffer memory 104. For example, buffer memory 104 can be a state buffer of a neural network accelerator, and the data being moved into buffer memory 104 by processing the set of memory descriptors M may correspond to input data (e.g., an input tensor) for an inference operation of a neural network model. The set of memory descriptors M can be populated with logical addresses that are not part of the normal memory map of the computing device (e.g., by setting one or more most-significant address bits that are not used in the normal memory map).

At operation 506, data D1 may become available to the computing system. Runtime driver 180 may generate address translation table data ATT-Data-1 at operation 508, and store the address translation table data ATT-Data-1 at the memory location in system memory 120 indicated by the address translation descriptor ATD. The address translation table data ATT-Data-1 may include information indicating an address translation window (e.g., base address and size) that encompasses the logical address range in the set of memory descriptors M. The address translation table data ATT-Data-1 may also include translated address information that can be used to translate the logical addresses in the set of memory descriptors M into the actual addresses (e.g., physical addresses) that should be used in the memory accesses to access data D1.

At operation 510, the address translation descriptor ATD is loaded into DMA engine 400, for example, by placing the address translation descriptor ATD into the read descriptor queue of DMA engine 400. At operation 511, the set of memory descriptors M are also loaded into DMA engine 400. The set of memory descriptors may include read memory descriptors paired with write memory descriptors, which are loaded into respective read descriptor queue and write descriptor queue of DMA engine 400.

At operation 512, the address translation descriptor ATD can be retrieved from the descriptor queue and be processed by DMA engine 400. At operation 514, address translation table data ATT-Data-1 (e.g., address translation information indicating an address translation window and translated address information) can be obtained based on the address translation descriptor ATD. For example, DMA engine 400 may perform a read at an address indicated in the address translation descriptor ATD to obtain the address translation table data ATT-Data-1. The address translation table data ATT-Data-1 is then stored in the address translation table of the DMA engine 400. In some implementations, a memory barrier can be inserted to ensure the address translation table has been updated before processing the next memory descriptor.

At operation 516, the set of memory descriptors M can be retrieved from the descriptor queue of DMA engine 400. For example, the head pointer of the descriptor queue can be updated to point to the first memory descriptor in the set of memory descriptors M such that the DMA engine 400 can process the set of memory descriptors M. For queue pair implementations, the head pointers for both the read descriptor queue and the write descriptor queue can be updated to respectively point to the start of the read memory descriptors in the set of memory descriptors M and to the start of the write memory descriptors in the set of memory descriptors M. The DMA engine may determine that addresses in the set of memory descriptors M are within the address translation window indicated in the address translation table, and translate the addresses using the translated address information in the address translation table.

DMA engine 400 may then perform a set of memory access operations using the translated addresses. For example, at operation 518, the read memory descriptors in the set of memory descriptors M with the translated addresses can be processed to read data D1 from system memory 120. At operation 520, the write memory descriptors in the set of memory descriptors M with the translated addresses can be processed to write data D1 into buffer memory 104. It should be noted that in some implementations, it may not be necessary to translate the addresses for both reads and writes. For example, the write memory descriptors may contain the physical addresses of the location to write the data, and the location can be the same for different instances of the data transfer. In such scenarios, the address translation window can be used to control which addresses are translated and which addresses remain untranslated in the set of memory descriptors M.

It should also be noted that the set of memory descriptors M can be reused and be processed multiple times to perform different instances of data transfer. Hence, by utilizing the address translation techniques as disclosed herein, the set of memory descriptors M for a particular access pattern may only need to be generated once. For example, in some implementations, the address translation descriptor and the set of memory descriptors M can remain in system memory 120 after the initial data transfer. To perform a subsequent data transfer, the address translation table data can be updated in system memory 120 to reflect the new address of the data being moved. The address translation descriptor and the set of memory descriptors M stored in system memory 120 can be reloaded into DMA engine 400, and be processed to effectuate a new data transfer.

Referring back to FIG. 5, at operation 522, data D2 may become available to the computing system. Runtime driver 180 may generate address translation table data ATT-Data-2 at operation 524 and store the data at the location in system memory 120 indicated by address translation descriptor ATD. The address translation table data ATT-Data-2 may include information indicating an address translation window (e.g., base address and size) that encompasses the logical address range in the set of memory descriptors M. The address translation table data ATT-Data-2 may also include translated address information that can be used to translate the logical addresses in the set of memory descriptors M into the actual addresses (e.g., physical addresses) that should be used in the memory accesses to access data D2.

At operation 526, the address translation descriptor ATD is loaded from system memory 120 into DMA engine 400, for example, by placing the address translation descriptor ATD into the read descriptor queue of DMA engine 400. At operation 527, the set of memory descriptors M are also loaded into DMA engine 400 (e.g., read memory descriptors paired with write memory descriptors, which are loaded into respective read descriptor queue and write descriptor queue of DMA engine 400).

At operation 528, the address translation descriptor ATD can be retrieved from the descriptor queue and be processed by DMA engine 400. At operation 528, address translation table data ATT-Data-2 (e.g., address translation information indicating an address translation window and translated address information) can be obtained based on the address translation descriptor ATD. For example, DMA engine 400 may perform a read at an address indicated in the address translation descriptor ATD to obtain the address translation table data ATT-Data-2. The address translation table data ATT-Data-2 is then stored in the address translation table of the DMA engine 400. In some implementations, a memory barrier can be inserted to ensure the address translation table has been updated before processing the next memory descriptor.

At operation 532, the set of memory descriptors M can be retrieved from the descriptor queue of DMA engine 400. For example, the head pointer of the descriptor queue can be updated to point to the first memory descriptor in the set of memory descriptors M such that the DMA engine 400 can process the set of memory descriptors M again. For queue pair implementations, the head pointers for both the read descriptor queue and the write descriptor queue can be updated to respectively point to the start of the read memory descriptors in the set of memory descriptors M and to the start of the write memory descriptors in the set of memory descriptors M. The DMA engine may determine that addresses in the set of memory descriptors M are within the address translation window indicated in the address translation table, and translate the addresses using the updated translated address information in the address translation table.

DMA engine 400 may then perform a set of memory access operations using the translated addresses. For example, at operation 534, the read memory descriptors in the set of memory descriptors M with the translated addresses can be processed to read data D2 from system memory 120. At operation 520, the write memory descriptors in the set of memory descriptors M with the translated addresses can be processed to write data D2 into buffer memory 104. In some implementations, it may not be necessary to translate the addresses for both reads and writes.

The above process can be repeated for each instance of data transfer that has a similar data access pattern. When a data transfer is to be performed at a new location, an address translation descriptor can be processed to update the address translation table with the new location information before processing the same set of memory descriptors. In this manner, each time the set of memory descriptors are processed, data transfer at a different location can be performed by updating the address translation table prior to processing the set of memory descriptors. As compared to FIG. 2, the DMA overhead to perform data transfers at memory locations determined at runtime can be greatly reduced. For example, in FIG. 5, each additional data transfer may only the runtime driver to generate the address translation table data to reflect the location of the new data being moved. In contrast, the technique in FIG. 2 may require hundreds of memory descriptors to be generated by the runtime driver for each data transfer.

In addition to performing data transfers that involve address translation, the DMA engine 400 can also perform data transfers without any address translation. For example, DMA engine 400 may retrieving another set of memory descriptors from the descriptor queue, and determine that addresses in the this set of memory descriptors are outside the address translation window indicated in the address translation table. As such, a set of memory access operations can be performed by using the addresses in the set of memory descriptors without having the address translated by the DMA engine. The address translation table may also include control data to invalidate the address translation table, such that memory access operations are performed without address translation in the DMA engine. When the control data indicates the address translation table is invalidated, memory access operations are performed without address translation regardless of whether the addresses are within the address translation window.

Figure 6:
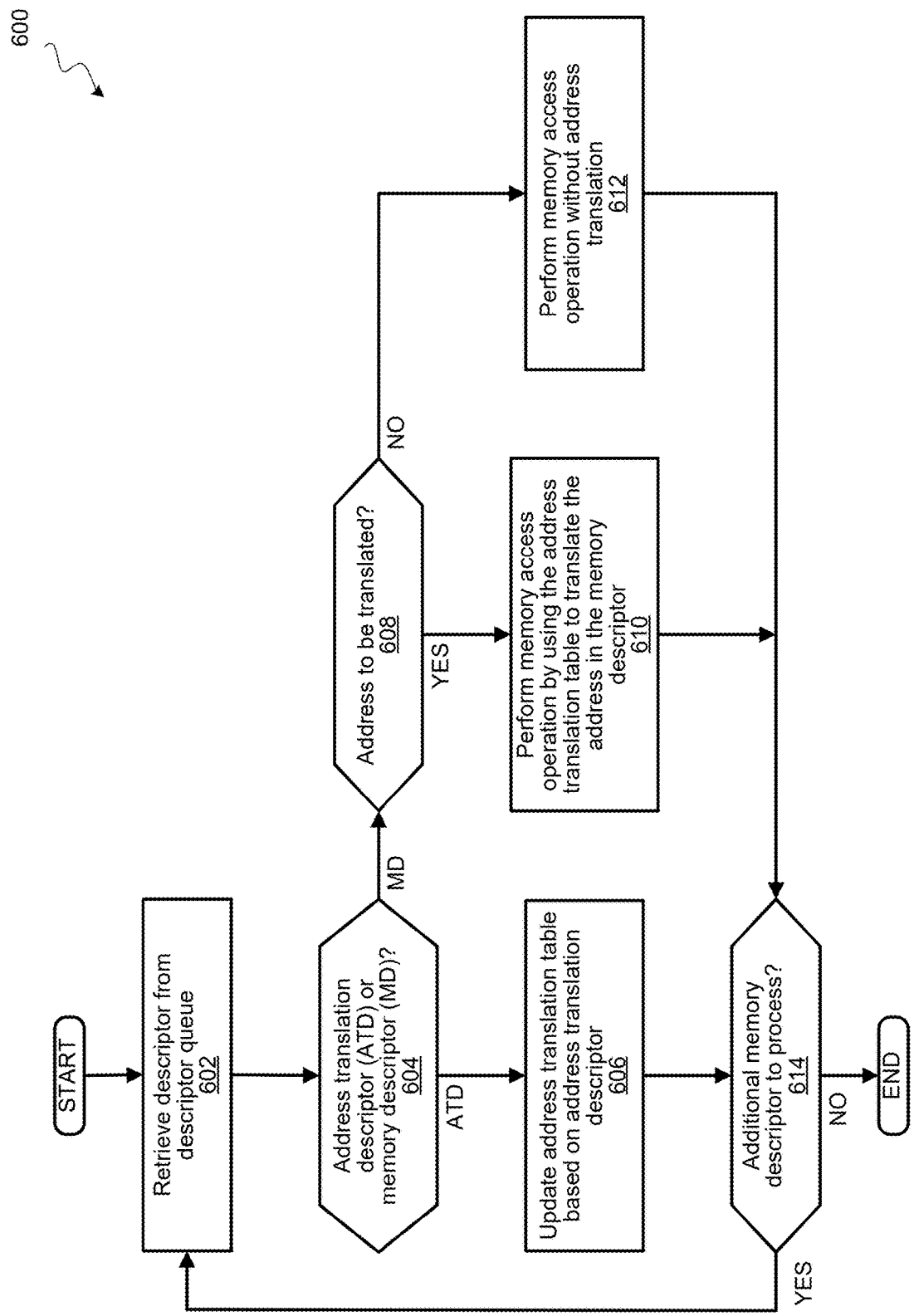
FIG. 6 illustrates a flow diagram of an example of a process to transfer data.

FIG. 6 illustrates a flow diagram of an example of a process 600 for performing memory access operations of a data transfer. Process 600 can be performed, for example, by DMA circuitry. The DMA circuitry can be, for example, a DMA controller in a DMA engine such as DMA engine 400. Process 600 may begin at block 602 by retrieving a descriptor from a descriptor queue of a DMA engine. At block 604, a determination is made as to whether the descriptor is an address translation descriptor or a memory descriptor. This determination can be made, for example, by checking the descriptor type field of the descriptor.

If it is determined that the descriptor retrieved is an address translation descriptor, then at block 606, the address translation table in the DMA engine is updated based on the address translation descriptor. For example, the address translation descriptor may include an address field pointing to the location of the address translation table data to update the address translation table with. The address translation table data may include address translation information indicating an address translation window (e.g., a base address indicating a starting address of the address translation window, and a size of the address translation window), and translated address information that can be used to translate a logical address into an actual address (translated address) that should be used for a data transfer. In some implementations, the address translation table data may also include control data that can be set to invalidate the address translation table.

If it is determined that the descriptor retrieved is a memory descriptor, then at block 608, the memory descriptor is processed by determining whether the address in the memory descriptor is to be translated using the address translation table. This determination can be made, for example, based in part on whether the address in the memory descriptor is within the address translation window indicated in the address translation table. This determination can also be based on whether the address translation information in the address translation table is invalidated.

If it is determined that the address in the memory descriptor is to be translated (e.g., address is within the address translation window, and the address translation information has not been invalidated), then at block 610, a memory access operation is performed by using the address translation table to translate the address in the memory descriptor. For example, the translated address information in the address translation table can be used to replace certain number of most-significant bits of the address, or can be added or subtracted from the address to derive the translated address.

If it is determined that the address in the memory descriptor need not be translated (e.g., address is outside the address translation window, or the address translation information has been invalidated), then at block 612, a memory access operation is performed using the memory descriptor without address translation.

At block 614, a determination is made as to whether any additional descriptor is pending in the descriptor queue. If there is a pending descriptor to process, then process 600 may return to block 602 to retrieve the next descriptor from the descriptor queue. If no additional descriptor is pending, process 600 can be terminated.

Process 600 can be performed on a set of memory descriptors corresponding to a data transfer to move data from system memory to a buffer memory. The set of memory descriptors can be processed multiple times. In each of the multiple times that the set of memory descriptors are processed, data from a different location of system memory can be moved into the buffer memory by updating the address translation table prior to processing the set of memory descriptors. Using the techniques disclosed herein, the set of memory descriptors can be processed multiple times without having a host system to generate the set of memory descriptors each time a new data transfer is to be performed. In some implementations, the buffer memory can be a state buffer of a neural network accelerator, and the data being moved into the buffer memory each time the set of memory descriptors are processed may correspond to different input data for an inference operation of a neural network model.

Figure 7:
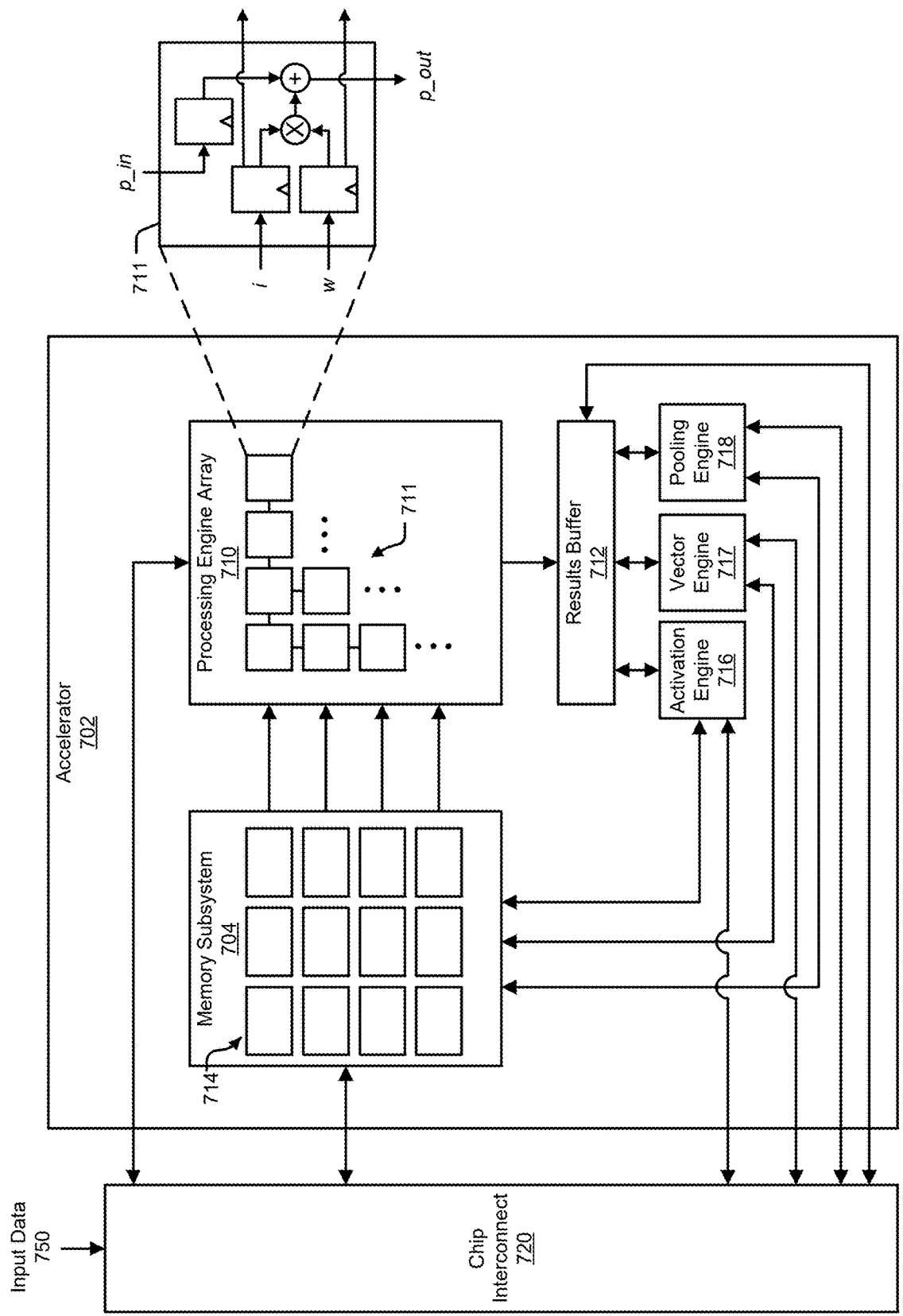
FIG. 7 illustrates a block diagram of an example of an integrated circuit device.

FIG. 7 is a block diagram illustrating an example of an accelerator 702. In some implementations, accelerator 702 can be used to implement accelerator 102. In various examples, the accelerator 702, for a set of input data (e.g., input data 750), can execute computations using a processing engine array 710, an activation engine 716, a vector engine 717, and/or a pooling engine 718. In some examples, the example accelerator 702 may be an integrated circuit component of a processor, such as a neural network processor. The processor may have other integrated circuit components, including additional accelerator engines.

In various implementations, the memory subsystem 704 can include multiple memory banks 714. Memory subsystem 704 can also be referred to as a state buffer. In these implementations, each memory bank 714 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 714. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 704 can permit simultaneous access to the read or write channels of multiple memory banks. As another example, the memory subsystem 704 can include arbitration logic such that arbitration between, for example, the outputs of multiple memory banks 714 can result in more than one memory bank's output being used. In these and other examples, though globally managed by the memory subsystem 704, each memory bank can be operated independently of any other.

Having the memory banks 714 be independently accessible can increase the efficiency of the accelerator 702. For example, values can be simultaneously read and provided to each row of the processing engine array 710, so that the entire processing engine array 710 can be in use in one clock cycle. As another example, the memory banks 714 can be read at the same time that results computed by the processing engine array 710 are written to the memory subsystem 704. In contrast, a single memory may be able to service only one read or write at a time. With a single memory, multiple clock cycles can be required, for example, to read input data for each row of the processing engine array 710 before the processing engine array 710 can be started.

In various implementations, the memory subsystem 704 can be configured to simultaneously service multiple clients, including the processing engine array 710, the activation engine 716, the vector engine 717, the pooling engine 718, and any external clients that access the memory subsystem 704 over a communication fabric 720. In some implementations, being able to service multiple clients can mean that the memory subsystem 704 has at least as many memory banks as there are clients. In some cases, each row of the processing engine array 710 can count as a separate client. In some cases, each column of the processing engine array 710 can output a result, such that each column can count as a separate write client. In some cases, output from the processing engine array 710 can be written into the memory banks 714 that can then subsequently provide input data for the processing engine array 710. As another example, the activation engine 716, the vector engine 717, and the pooling engine 718 can include multiple execution channels, each of which can be separate memory clients. The memory banks 714 can be implemented, for example, using static random access memory (SRAM).

In various implementations, the memory subsystem 704 can include control logic. The control logic can, for example, keep track of the address spaces of each of the memory banks 714, identify memory banks 714 to read from or write to, and/or move data between the memory banks 714. In some implementations, memory banks 714 can be hardwired to particular clients. For example, a set of memory banks 714 can be hardwired to provide values to the rows of the processing engine array 710, with one memory bank servicing each row. As another example, a set of memory banks can be hard wired to receive values from columns of the processing engine array 710, with one memory bank receiving data for each column.

The processing engine array 710 is the computation matrix of the example accelerator 702. The processing engine array 710 can, for example, execute parallel integration, convolution, correlation, and/or matrix multiplication, among other things. The processing engine array 710 includes multiple processing engines 711, arranged in rows and columns, such that results output by one processing engine 711 can be input directly into another processing engine 711. Processing engines 711 that are not on the outside edges of the processing engine array 710 thus can receive data to operate on from other processing engines 711, rather than from the memory subsystem 704.

In various examples, the processing engine array 710 uses systolic execution, in which data arrives at each processing engine 711 from different directions at regular intervals. In some examples, input data can flow into the processing engine array 710 from the left and weight values can be loaded at the top. In some examples weights and input data can flow from the left and partial sums can flow from top to bottom. In these and other examples, a multiply-and-accumulate operation moves through the processing engine array 710 as a diagonal wave front, with data moving to the right and down across the array. Control signals can be input at the left at the same time as weights, and can flow across and down along with the computation.

In various implementations, the number of columns in the processing engine array 710 determines the computational capacity of the processing engine array 710, and the number of rows determines the required memory bandwidth for achieving maximum utilization of the processing engine array 710. The processing engine array 710 can have, for example, 64 columns and 128 rows, or some other number of columns and/or rows.

An example of a processing engine 711 is illustrated in FIG. 7 in an inset diagram. As illustrated by this example, a processing engine 711 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 711.

In the illustrated example, an input from above can include a partial sum, p_in, provided either from another processing engine 711 or from a previous round of computation by the processing engine array 710. When starting a computation for a new set of input data, the top row of the processing engine array 710 can receive a fixed value for p_in, such as zero. As illustrated by this example, i and w are multiplied together and the result is summed with p_in to produce a new partial sum, p_out, which can be input into another processing engine 711. Various other implementations of the processing engine 711 are possible.

Outputs from the last row in the processing engine array 710 can be temporarily stored in the results buffer 712. The results can be intermediate results, which can be written to the memory banks 714 to be provided to the processing engine array 710 for additional computation. Alternatively, the results can be final results, which, once written to the memory banks 714 can be read from the memory subsystem 704 over the communication fabric 720, to be output by the system.

In some implementations, the accelerator 702 includes an activation engine 716. In these implementations, the activation engine 716 can combine the results from the processing engine array 710 into one or more output activations. For example, for a convolutional neural network, convolutions from multiple channels can be summed to produce an output activation for a single channel. In other examples, accumulating results from one or more columns in the processing engine array 710 may be needed to produce an output activation for a single node in the neural network. In some examples, activation engine 716 can be bypassed.

In various examples, the activation engine 716 can include multiple separate execution channels. In these examples, the execution channels can correspond to the columns of the processing engine array 710, and can perform an operation on the outputs of a column, the result of which can be stored in the memory subsystem 704. In these examples, the activation engine 716 may be able to perform between 1 and n parallel computations, where n is equal to the number of columns in the processing engine array 710. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 702 can include a pooling engine 718. Pooling is the combining of outputs of the columns of the processing engine array 710. Combining can include for example, computing a maximum value, a minimum value, an average value, a median value, a summation, a multiplication, or another logical or mathematical combination. In various examples, the pooling engine 718 can include multiple execution channels that can operating on values from corresponding columns of the processing engine array 710. In these examples, the pooling engine 718 may be able to perform between 1 and n parallel computations, where n is equal to the number of columns in the processing engine array 710. In various examples, execution channels of the pooling engine 718 can operate in parallel and/or simultaneously. In some examples, the pooling engine 718 can be bypassed.

In some implementations, the accelerator 702 can further include a vector engine 717. Vector engine 717 is a compute engine that can perform computations and manipulations on values stored in memory subsystem 704 and/or results buffer 712 such as values representing matrices of input values, weight values, intermediate results, etc. Vector engine 717 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 717 can operate in parallel and/or simultaneously. In some examples, the vector engine 717 can be bypassed or be omitted.

Herein, the activation engine 716, the vector engine 717, and the pooling engine 718 may be referred to collectively as execution engines. The processing engine array 710 is another example of an execution engine. Another example of an execution engine is a Direct Memory Access (DMA) engine, which may be located outside the accelerator 702.

Input data 750 can arrive over the communication fabric 720. The communication fabric 720 can connect the accelerator 702 to other components of a processor, such as a DMA engine that can obtain input data 750 from an Input/Output (I/O) device, a storage drive, or a network interface. The input data 750 can be, for example one-dimensional data, such as a character string or numerical sequence, or two-dimensional data, such as an array of pixel values for an image or frequency and amplitude values over time for an audio signal. In some examples, the input data 750 can be three-dimensional, as may be the case with, for example, the situational information used by a self-driving car or virtual reality data. In some implementations, the memory subsystem 704 can include a separate buffer for the input data 750. In some implementations, the input data 750 can be stored in the memory banks 714 when the accelerator 702 receives the input data 750.

In some examples, the accelerator 702 can implement a neural network processing engine. In these examples, the accelerator 702, for a set of input data 750, can execute a neural network to perform a task for which the neural network was trained. Executing a neural network on a set of input data can be referred to as inference or performing inference.

The weights for the neural network can be stored in the memory subsystem 704, along with input data 750 on which the neural network will operate. The neural network can also include instructions, which can program the processing engine array 710 to perform various computations on the weights and the input data. The instructions can also be stored in the memory subsystem 704, in the memory banks 714 or in a separate instruction buffer. The processing engine array 710 can output intermediate results, which represent the outputs of individual layers of the neural network. In some cases, the activation engine 716, the vector engine 717, and/or pooling engine 718 may be enabled for computations called for by certain layers of the neural network. The accelerator 702 can store the intermediate results in the memory subsystem 704 for inputting into the processing engine array 710 to compute results for the next layer of the neural network. The processing engine array 710 can further output final results from a last layer of the neural network. The final results can be stored in the memory subsystem 704 and then be copied out to host processor memory or to another location.

Figure 8:
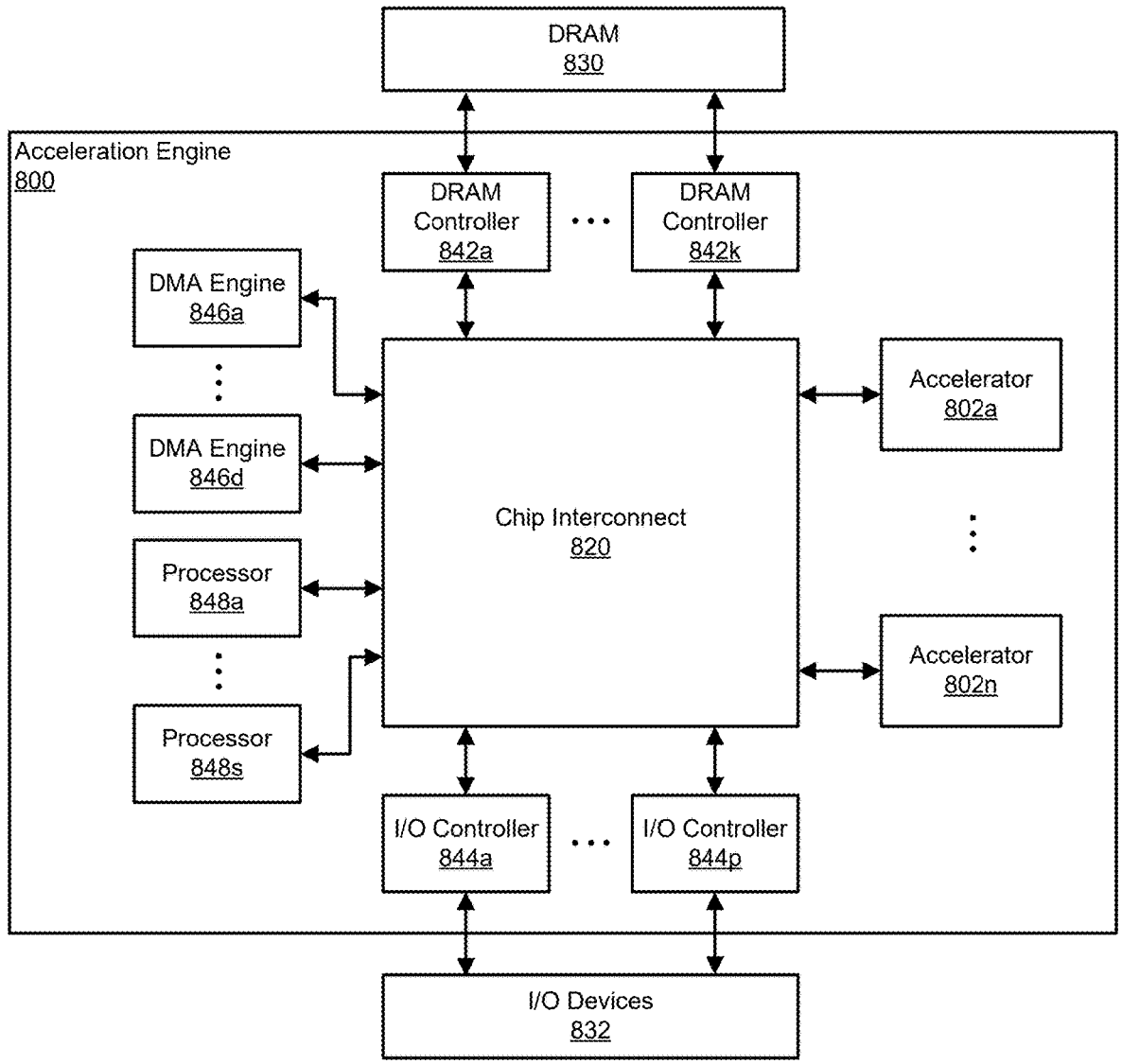
FIG. 8 illustrates a block diagram of an example of an acceleration engine.

FIG. 8 includes a block diagram that illustrates an example of an acceleration engine 800. The acceleration engine 800 is an example of an integrated circuit that can include one or more accelerators 802*a*-802*n* that may be similar to the accelerator illustrated in FIG. 7.

In the example of FIG. 8, the acceleration engine 800 includes multiple accelerators 802*a*-802*n*, each of which can perform a set of operations. In various examples, the accelerators 802*a*-802*n* are for particular types of operations, so that the accelerators 802*a*-802*n* can perform the operations much faster than when similar operations are performed by a general-purpose processor. In various examples, to perform a set of operations, input data on which the operations are to be performed must first be moved into the accelerators 802*a*-802*n*. Additionally, in some cases, program code is also moved into the accelerators 802*a*-802*n*, which programs the operations that the accelerators 802*a*-802*n* will perform on the data. In the illustrated example, the acceleration engine 800 includes n accelerators 802*a*-802*n*. Examples of accelerators that can be included in the acceleration engine 800 include graphics accelerators, floating point accelerators, neural network accelerators, and others. In various examples, the accelerators 802*a*-802*n* can each be the same (e.g., each of the is a graphics accelerator) or can be different (e.g., the accelerators 802*a*-802*n* include a graphics accelerator, a floating point accelerator, and neural network accelerator).

The example acceleration engine 800 further includes DRAM controllers 842*a*-842*k* for communicating with an external memory. The external memory is implemented, in this example, using DRAM 830. In the illustrated example, the acceleration engine 800 includes k DRAM controllers 842*a*-842*k*, each of which may be able to communicate with an independent set of banks of DRAM. In other examples, other types of RAM technology can be used for the external memory. The DRAM controllers 842*a*-842*k* can also be referred to as memory controllers.

In various examples, input data and/or program code for the accelerators 802*a*-802*n* can be stored in the DRAM 830. Different programs can cause the accelerators 802*a*-802*n* to perform different operations. For example, when one of the accelerators is a neural network accelerator, one program can configure the neural network accelerator to perform speech recognition while another program can configure the neural network accelerator to perform image recognition. In various examples, different accelerators 802*a*-802*n* can be programmed with different programs, so that each performs a different set of operations. In various examples, the processors 848*a*-848*s* can manage moving of program code from the DRAM 830 to the accelerators 802*a*-802*n*.

The example acceleration engine 800 further includes I/O controllers 844*a*-844*p* for communicating with I/O devices 832 in the system. The acceleration engine 800 can communicate with I/O devices over, for example, a processor bus. In some examples, the processor bus can be implemented using Peripheral Component Interconnect (PCI) and/or a variation of the PCI bus protocol. The processor bus can connect the acceleration engine 800 to I/O devices such as, for example, input and output devices, memory controllers, storage devices, and/or network interface cards, among other things. In some examples, the I/O controllers 844-844*p* can enable the acceleration engine 800 to act as an I/O device for a host processor. For example, the acceleration engine 800 can be the recipient of input data from the host processor, and a command indicating an operation to be performed on the input data (e.g., a particular computation or analysis). In the illustrated example, the acceleration engine 800 includes p I/O controllers 844a-844p, each of which may include a separate root complex and may communicate with a separate set of I/O devices 832. In other examples, other standardized bus protocols, such as Ultra Path Interconnect (UPI) can be used for the host bus. In other examples, a proprietary bus protocol can be used.

Movement of data in the acceleration engine 800 can be managed by one or more processors 848a-848s, which can also be referred to as data management processors. In the example of FIG. 8, the acceleration engine 800 includes s processors 848a-848s incorporated into the device (e.g., on the same silicon die). In other examples, the processors 848a-848s can be external to the acceleration engine 800 (e.g., on a different die and/or in a different package). In some examples, the processors 848a-848s can manage the movement of data from I/O devices 832 to the accelerators 802a-802n or the DRAM 830. For example, input data may be located at an I/O device 832 or in processor memory, and the processors 848a-848s can move the input from the I/O device 832 or processor memory into an accelerator or into DRAM 830. As another example, program code for the accelerators 802a-802n may be located on an I/O device 832 or in processor memory.

The example acceleration engine 800 further includes DMA engines 846a-846d (e.g., each can be DMA engine 400) that can move data between the accelerators 802a-802n, DRAM controllers 842a-842k, and I/O controllers 844a-844p. In the illustrated example, the acceleration engine 800 includes four DMA engines 846a-846d. In some implementations, the DMA engines 846a-846d can be assigned to specific tasks, such as moving data from the DRAM controllers 842a-842d to the accelerators 802a-802n, or moving data between the I/O controllers 844a-844p and the accelerators 802a-802n. These tasks can be assigned, for example, by enqueueing descriptors with the DMA engines 846a-846d, where a descriptor identifies an address for a block of data and an operation (e.g., a read or a write) to perform. A descriptor, for example, can direct a DMA engine to instruct a DMA controller to read a block of data from DRAM 830. A descriptor can, as a further example, instruct the DMA engine to write data, read by the DMA controller, to an accelerator. Further descriptors can be used to move data from an accelerator to DRAM 830.

In various examples, each of the processors 848a-848s can be responsible for managing the data movement for a different accelerator. In some examples, a processor may manage the data movement for more than one accelerator. Similarly, in various examples, each of the processors 848a-848s can be assigned to one or more DMA engines 846a-846d. In these and other examples, associations between processors 848a-848s, accelerators 802a-802n, and DMA engines 846a-846d are determined by program code being executed by each respective processor.

In the example acceleration engine 800, the various components can communicate over a chip_interconnect 820. The chip_interconnect 820 primarily includes wiring for routing data between the components of the acceleration engine 800. In some cases, the chip_interconnect 820 can include a minimal amount of logic, such as multiplexors to control the direction of data, flip-flops for handling clock domain crossings, and timing logic.

Figure 9:
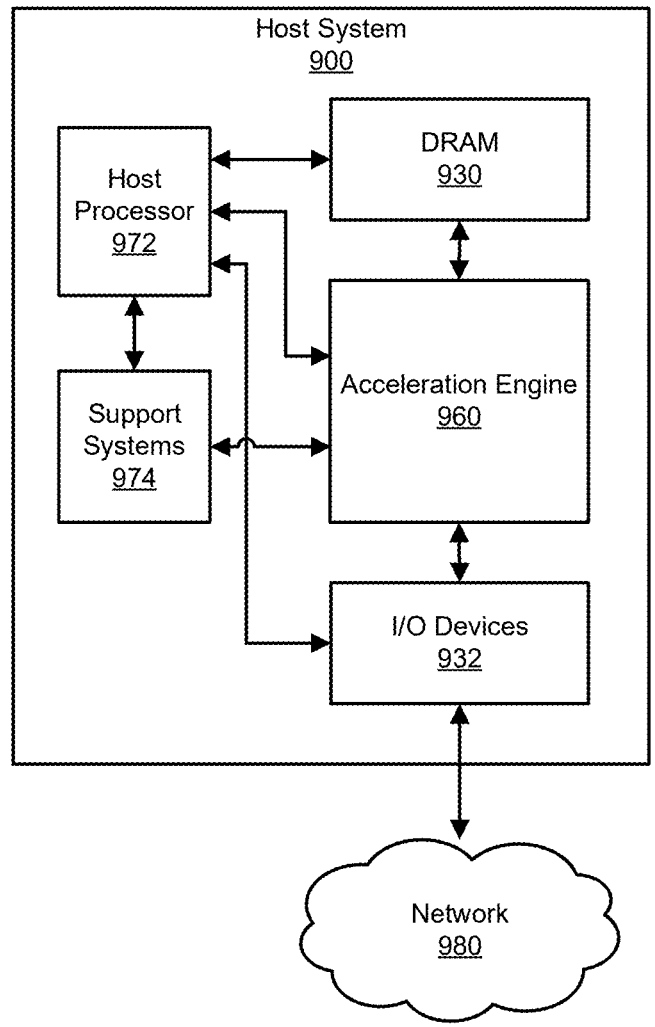
FIG. 9 illustrates a block diagram of an example of a host system.

FIG. 9 includes a block diagram that illustrates an example of a host system 900 in which an acceleration engine 960 can be used. The acceleration engine 960 of FIG. 9 is an example of a device that can include one or more accelerators such as is illustrated in FIG. 8. The example host system 900 of FIG. 9 includes the acceleration engine 960, a host processor 972, DRAM 930 or processor memory, I/O devices 932, and support systems 974. In various implementations, the host system 900 can include other hardware that is not illustrated here.

The host processor 972 is a general-purpose integrated circuit that is capable of executing program instructions. In some examples, the host processor 972 can include multiple processing cores. A multi-core processor may include multiple processing units within the same processor. In some examples, the host system 900 can include more than one host processor 972. In some examples, the host processor 972 and the acceleration engine 960 can be one chip, such as, one or more integrated circuits within the same package.

In various examples, the host processor 972 can communicate with other components in the host system 900 over one or more communication channels. For example, the host system 900 can include a host processor bus, which the host processor 972 can use to communicate with the DRAM 930, for example. As another example, the host system 900 can include an I/O bus, such as a PCI-based bus, over which the host processor 972 can communicate with the acceleration engine 960 and/or the I/O devices 932, for example. In various examples, the host system 900 can, alternatively or additionally, include other communication channels or busses, such as serial busses, power management busses, storage device busses, and so on.

In some examples, software programs executing on the host processor 972 can receive or generate input for processing by the acceleration engine 960. In some examples, the programs can select an appropriate neural network to execute for a given input. For example, a program may be for language translation, and can select one or more neural networks capable of speech recognition and/or machine translation. In these and other examples, the programs can configure the acceleration engine 960 with the neural network to execute, and/or can select a neural network processing engine on the acceleration engine 960 that has previously been configured to execute the desired neural network. In some examples, once the acceleration engine 960 has started an inference on input data, the host processor 972 can manage the movement of data (such as weights, instructions, intermediate results, results of conditional layers, and/or final results) into or out of the acceleration engine 960.

In some examples, a software program that is using the acceleration engine 960 to conduct an inference can read the result from a conditional layer from the acceleration engine 960 and/or from a storage location, such as in DRAM 930. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 930 is memory that is used by the host processor 972 for storage of program code that the host processor 972 is in the process of executing, as well as values that are being operated on. In some examples, the data for a neural network (e.g., weight values, instructions, and other data) can be all or partially stored in the DRAM 930. DRAM is a common term for processor memory, and though DRAM is volatile memory, processor memory can be volatile and/or non-volatile. Though not illustrated here, the host system 900 can include other volatile and non-volatile memories for other purposes. For example, the host system 900 can include a Read-Only Memory (ROM) that stores boot code for booting the host system 900 at power on, and/or Basic Input/Output System (BIOS) code.

Though not illustrated here, the DRAM 930 can store instructions for various programs, which can be loaded into and be executed by the host processor 972. For example, the DRAM 930 can be storing instructions for an operating system, one or more data stores, one or more application programs, one or more drivers, and/or services for implementing the features disclosed herein.

The operating system can manage and orchestrate the overall operation of the host system 900, such as scheduling tasks, executing applications, and/or controller peripheral devices, among other operations. In some examples, a host system 900 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers.

Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 900. For example, some drivers can provide communication between the operating system and peripheral devices or I/O devices 932. Alternatively or additionally, some drivers may provide communication between application programs and the operating system, and/or application programs and peripheral devices accessible to the host system 900. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 932 can include hardware for connecting to user input and output devices, such as keyboards, mice, pens, tablets, voice input devices, touch input devices, displays or monitors, speakers, and printers, among other devices. The I/O devices 932 can also include storage drives and/or network interfaces for connecting to a network 980. For example, the host system 900 can use a network interface to communicate with storage devices, user terminals, other computing devices or servers, and/or other networks, among various examples.

In various examples, one or more of the I/O devices 932 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 900 or may be in an external enclosure. A storage device can be fixed (e.g., attached by screws) or removable (e.g., having a physical release mechanism and possibly a hot-plug mechanism).

Storage devices, the DRAM 930, and any other memory component in the host system 900 are examples of computer-readable storage media. Computer-readable storage media are physical mediums that are capable of storing data in a format that can be read by a device such as the host processor 972. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 932 can be PCI-based devices. In these examples, a PCI-based I/O device includes a PCI interface for communicating with the host system 900. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 974 can include hardware for coordinating the operations of the acceleration engine 960. For example, the support systems 974 can include a microprocessor that coordinates the activities of the acceleration engine 960, including moving data around on the acceleration engine 960. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 972. In some examples, the program executed by the microprocessor is stored on the hardware of microprocessor, or on a non-volatile memory chip_in the host system 900. In some examples, the microprocessor and the acceleration engine 960 can be on chip, such as one integrated circuit on the same die and in the same package.

In some examples, the support systems 974 can be responsible for taking instructions from the host processor 972 when programs executing on the host processor 972 request the execution of a neural network. For example, the host processor 972 can provide the support systems 974 with a set of input data and a task that is to be performed on the set of input data. In this example, the support systems 974 can identify a neural network that can perform the task, and can program the acceleration engine 960 to execute the neural network on the set of input data. In some examples, the support systems 974 only needs to select an appropriate neural network processing engine of the neural network processor. In some examples, the support systems 974 may need to load the data for the neural network onto the acceleration engine 960 before the acceleration engine 960 can start executing the neural network. In these and other examples, the support systems 974 can further receive the output of executing the neural network, and provide the output back to the host processor 972.

In some examples, the operations of the support systems 974 can be handled by the host processor 972. In these examples, the support systems 974 may not be needed and can be omitted from the host system 900.

In various examples, the host system 900 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 900 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for operating a direct memory access (DMA) engine to reuse a set of memory descriptors to perform memory accesses at different memory regions, the method comprising:
   retrieving a first address translation descriptor from a descriptor queue;
   obtaining first address translation table data based on the first address translation descriptor, the first address translation table data including information indicating a first address translation window and first translated address information;
   storing the first address translation table data in an address translation table of the DMA engine;
   retrieving a set of memory descriptors from the descriptor queue;
   determining that addresses in the set of memory descriptors are within the first address translation window;
   performing a first set of memory access operations by using the first translated address information to translate the addresses in the set of memory descriptors;
   retrieving a second address translation descriptor from the descriptor queue;
   obtaining second address translation table data based on the second address translation descriptor, the second address translation table data including information indicating a second address translation window and second translated address information;
   storing the second address translation table data in the address translation table of the DMA engine;
   retrieving the set of memory descriptors from the descriptor queue;
   determining that the addresses in the set of memory descriptors are within the second address translation window; and
   reusing the set of memory descriptors that was used for the first set of memory access operations to perform a second set of memory access operations to access memory locations that are different than the first set of memory access operations by using the second translated address information to translate the addresses in the set of memory descriptors.

2. The method of claim 1, further comprising:
   retrieving a second set of memory descriptors from the descriptor queue;
   determining that addresses in the second set of memory descriptors are outside the second address translation window indicated in the address translation table; and
   performing a third set of memory access operations by using the addresses in the second set of memory descriptors without address translation in the DMA engine.

3. The method of claim 1, wherein the address translation table includes control data operable to invalidate the address translation table, and wherein memory access operations are performed without address translation in the DMA engine when the control data indicates the address translation table is invalidated.

4. The method of claim 1, wherein the first address translation table data and the second address translation table data are generated during runtime of an application being executed.

5. A direct memory access (DMA) engine comprising:
   a descriptor queue;
   an address translation table operable to store address translation information; and
   a controller operable to:
      retrieve an address translation descriptor from the descriptor queue, the address translation descriptor indicating a location of the address translation information;

update the address translation table with the address translation information obtained from the location indicated in the address translation descriptor;
retrieve a set of memory descriptors from the descriptor queue; and
process the set of memory descriptors by:
determining that addresses in the set of memory descriptors are to be translated using the address translation table; and
performing memory access operations for a first data transfer by using the address translation table to translate the addresses in the set of memory descriptors,
wherein the controller is configured to reuse the set of memory descriptors for a second data transfer to access memory locations that are different than the first data transfer by updating the address translation table prior to processing the set of memory descriptors for a second time.

6. The DMA engine of claim 5, wherein the controller is operable to process the set of memory descriptors multiple times, and
wherein in each of the multiple times that the set of memory descriptors is processed, data from a different location of a system memory is moved into a buffer memory by updating the address translation table prior to processing the set of memory descriptors.

7. The DMA engine of claim 6, wherein the controller is operable to process the set of memory descriptors multiple times without having a host system to generate the set of memory descriptors each time the set of memory descriptors is processed by the DMA engine.

8. The DMA engine of claim 6, wherein the buffer memory is a state buffer of a neural network accelerator, and the data being moved into the buffer memory each time the set of memory descriptors is processed corresponds to different input data for an inference operation of a neural network model.

9. The DMA engine of claim 5, wherein the address translation descriptor includes a descriptor type field to identify the address translation descriptor as a descriptor that is processed to update the address translation table.

10. The DMA engine of claim 5, wherein the address translation descriptor includes an address field pointing to the location of the address translation information.

11. The DMA engine of claim 5, wherein the address translation information includes information indicating an address translation window, and wherein the controller is operable to determine that the addresses in the set of memory descriptors are to be translated based on the addresses being within the address translation window.

12. The DMA engine of claim 11, wherein the information indicating the address translation window includes a base address and a size of the address translation window.

13. The DMA engine of claim 5, wherein the address translation table is operable to store control data to invalidate address translation information in the address translation table, and wherein the controller is operable to perform memory access operations without address translation when the control data indicates the address translation information is invalidated.

14. The DMA engine of claim 5, wherein the address translation table is operable to store multiple sets of address translation information, and control data indicating which set of address translation information is active.

15. The DMA engine of claim 5, wherein the descriptor queue is a read descriptor queue of a queue pair that also includes a write descriptor queue, and wherein the address translation descriptor is retrieved from the read descriptor queue to update the address translation table with address translation information for both the read descriptor queue and the write descriptor queue of the queue pair.

16. A method comprising:
retrieving an address translation descriptor from a descriptor queue of a direct memory access engine, the address translation descriptor indicating a location of address translation information;
updating an address translation table in the direct memory access engine with the address translation information obtained from the location indicated in the address translation descriptor;
retrieving a set of memory descriptors from the descriptor queue; and
processing the set of memory descriptors by:
determining that addresses in the set of memory descriptors are to be translated using the address translation table; and
performing memory access operations for a first data transfer by using the address translation table to translate the addresses in the set of memory descriptors,
wherein the set of memory descriptors is reused for a second data transfer to access memory locations that are different than the first data transfer by updating the address translation table prior to processing the set of memory descriptors for a second time.

17. The method of claim 16, further comprising:
processing the set of memory descriptors multiple times,
wherein in each of the multiple times that the set of memory descriptors is processed, data from a different location of a system memory is moved into a buffer memory by updating the address translation table prior to processing the set of memory descriptors.

18. The method of claim 17, wherein the set of memory descriptors is processed multiple times without having a host system to generate the set of memory descriptors each time the set of memory descriptors are processed.

19. The method of claim 17, wherein the buffer memory is a state buffer of a neural network accelerator, and the data being moved into the buffer memory each time the set of memory descriptors is processed corresponds to different input data for an inference operation of a neural network model.

20. The method of claim 16, wherein the address translation descriptor includes:
a descriptor type field to identify the address translation descriptor as a descriptor that is processed to update the address translation table with address translation information; and
an address field pointing to the location of the address translation information.

* * * * *